US011919510B2

(12) United States Patent
Cohen et al.

(10) Patent No.: US 11,919,510 B2
(45) Date of Patent: Mar. 5, 2024

(54) OBSTACLE AVOIDANCE IN AUTONOMOUS VEHICLES

(71) Applicant: ELTA SYSTEMS LTD., Ashdod (IL)

(72) Inventors: Ofir Cohen, Tzelafon (IL); Dina Appelman, Bat-Yam (IL)

(73) Assignee: ELTA SYSTEMS LTD., Ashdod (IL)

( * ) Notice: Subject to any disclaimer, the term of this patent is extended or adjusted under 35 U.S.C. 154(b) by 525 days.

(21) Appl. No.: 17/258,114

(22) PCT Filed: Jun. 30, 2019

(86) PCT No.: PCT/IL2019/050723
§ 371 (c)(1),
(2) Date: Jan. 5, 2021

(87) PCT Pub. No.: WO2020/008451
PCT Pub. Date: Jan. 9, 2020

(65) Prior Publication Data
US 2021/0284143 A1 Sep. 16, 2021

(30) Foreign Application Priority Data
Jul. 5, 2018 (IL) .......................................... 260449

(51) Int. Cl.
*B60W 30/09* (2012.01)
*B60W 30/18* (2012.01)
(Continued)

(52) U.S. Cl.
CPC ...... *B60W 30/09* (2013.01); *B60W 30/18009* (2013.01); *B60W 50/06* (2013.01);
(Continued)

(58) Field of Classification Search
CPC ........... B60W 30/09; B60W 30/18009; B60W 50/06; B60W 60/0015; B60W 2420/42;
(Continued)

(56) References Cited

U.S. PATENT DOCUMENTS 5,006,988 A * 4/1991 Borenstein ........... G05D 1/0255
701/25
9,170,327 B2 * 10/2015 Choe .................... G05D 1/0248
(Continued)

FOREIGN PATENT DOCUMENTS

CN 106003064 A 10/2016
EP 2503423 A1 9/2012
(Continued)

OTHER PUBLICATIONS

Minguez, Javier, and Luis Montano. "Extending collision avoidance methods to consider the vehicle shape, kinematics, and dynamics of a mobile robot." IEEE Transactions on Robotics 25.2 (2009): 367-381. (Year: 2009).*

(Continued)

*Primary Examiner* — Russell Frejd
*Assistant Examiner* — Ana D Thomas
(74) *Attorney, Agent, or Firm* — BROWDY AND NEIMARK, P.L.L.C.

(57) ABSTRACT

The presently disclosed subject matter includes a computerized method and a control system mountable on a vehicle for autonomously controlling the vehicle and enabling to execute a point-turn while avoiding collision with nearby obstacles. More specifically, the proposed technique enables an autonomous vehicle, characterized by an asymmetric contour, to execute a collision free point-turn, in an area crowded with obstacles. The disclosed method enables execution of a point turn quickly, without requiring the vehicle to stop.

23 Claims, 11 Drawing Sheets

(51) Int. Cl.
  *B60W 50/06* (2006.01)
  *B60W 60/00* (2020.01)
(52) U.S. Cl.
  CPC ..... *B60W 60/0015* (2020.02); *B60W 2420/42* (2013.01); *B60W 2420/62* (2013.01)
(58) Field of Classification Search
  CPC .. B60W 2420/62; B60W 30/08; G05D 1/024; G05D 1/0214; G05D 1/0055; G08C 25/02; G08G 1/165
  See application file for complete search history.

(56) References Cited

U.S. PATENT DOCUMENTS

| | | | | |
|---|---|---|---|---|
| 9,472,109 | B2* | 10/2016 | Starr | G08G 5/0017 |
| 2009/0062974 | A1* | 3/2009 | Tamamoto | G05D 1/0295 |
| | | | | 701/25 |
| 2016/0299254 | A1 | 10/2016 | Martinez De La Escalera et al. | |

FOREIGN PATENT DOCUMENTS

| | | |
|---|---|---|
| EP | 2503424 A1 | 9/2012 |
| EP | 2879116 A1 | 6/2015 |
| WO | 201714851 A1 | 9/2017 |

OTHER PUBLICATIONS

Hoy, Michael. "Methods for collision-free navigation of multiple mobile robots in unknown cluttered environments." arXiv preprint arXiv:1401.6775 (2014). (Year: 2014).*

Arras, Kai O., et al. "Real-time obstacle avoidance for polygonal robots with a reduced dynamic window." Proceedings 2002 IEEE International Conference on Robotics and Automation (Cat. No. 02CH37292). vol. 3. IEEE, 2002 (Year: 2002).*

Gong, Jianwei, et al. "A robust multistrategy unmanned ground vehicle navigation method using laser radar." 2009 IEEE Intelligent Vehicles Symposium. IEEE, 2009 (Year: 2009).* en.wikipedia.org/wiki/Vector_Field_Histogram (Mar. 20, 2017).

Minguez, Javier, and Luis Montano, "Extending collision avoidance methods to consider the vehicle shape, kinematics, and dynamics of a mobile robot", IEEE Transactions on Robotics 25.2 (2009): 367-381.

Mujahed, Muhannad et al., "Tangential closest gap based (TCG) reactive obstacle avoidance navigation for cluttered environments", IEEE International Symposium on Safety, Security, and Rescue Robotics (SSRR) IEEE, 2013.

Chen, Kuang-Hsiung, and Wen-Hsiang Tsai, "Vision-based obstacle detection and avoidance for autonomous land vehicle navigation in outdoor roads", Automation in Construction 10.1 (2000): 1-25.

Fox, et al., Controlling Synchro-drive Robots with the Dynamic Window Approach to Collision Avoidance, Proceedings of IEEE/RSJ International Conference on Intelligent Robots and Systems, 1996, pp. 1-9, vol. 3.

* cited by examiner

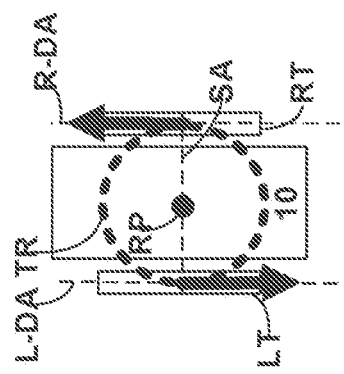
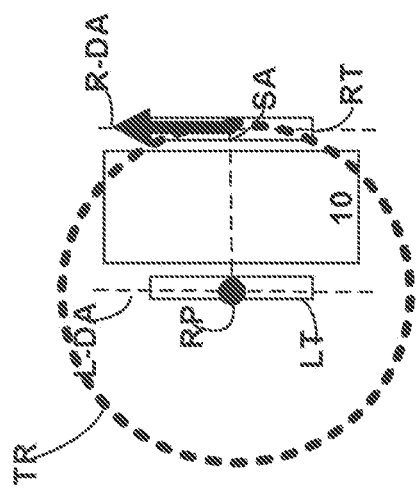
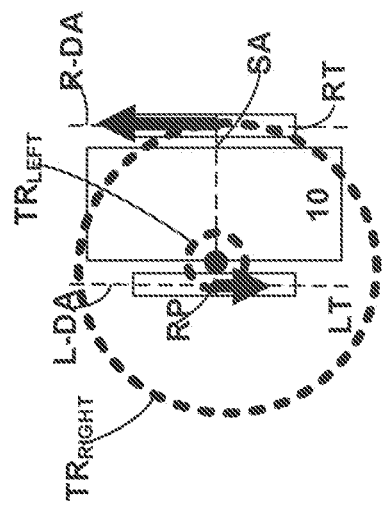

OBSTACLE AVOIDANCE IN AUTONOMOUS VEHICLES

FIELD OF INVENTION

The presently disclosed subject matter relates to unmanned vehicles, and more particularly to obstacle avoidance by unmanned vehicles.

BACKGROUND

In general, an unmanned ground vehicle (UGV), also referred to as an uncrewed vehicle, is a mobile machine that travels by integrating sensory data with computer-based decision-making for the purpose of autonomously driving the vehicle. The vehicle can, in some cases, carry passengers, e.g. operators that cannot see the surrounding environment and/or maneuver the vehicle.

Various methods of obstacle avoidance during navigation of UGVs are known. One example is vector field histogram (VFH) and its variants including VFH+ and VFH*.

GENERAL DESCRIPTION

The presently disclosed subject matter is related to obstacle avoidance during autonomous navigation of a UGV. Obstacle avoidance of autonomous vehicles is a challenging task in general, particularly when navigating in an area which is densely crowded with obstacles, leaving the vehicle with limited maneuvering space. In such scenarios, the vehicle is many times required to maneuver very close to obstacles, and therefore an accurate method of detecting obstacles and controlling the vehicle is needed. Furthermore, this challenge becomes even more demanding when the vehicle is characterized by an asymmetric contour, and, accordingly, its ability to safely traverse through an area depends on its direction of movement.

In many cases, while traversing an area densely crowded with obstacles, a UGV is required to perform a point-turn. The term "point-turn" or "rotation" as used herein refers to a turn where the center of rotation is located along a driving symmetry axis, which is a line intersecting a first driving element axis on one side of the vehicle, and a second driving element axis on the other side of the vehicle. The term "driving element" refers to a device or system used for driving the vehicle and includes, for example, wheels and tracks. During a point-turn the driving element on one side of the vehicle turns in one direction (e.g. forward) and the other driving element on the other side of the vehicle turns in the opposite direction (e.g. reverse), resulting in rotation of the vehicle about a point along the driving symmetry axis. As explained further below in some examples, only one driving element on one side may move during a point-turn, in which case the vehicle turns about a rotation point which is located on the immobile driving element axis.

Since this type of turn allows the vehicle to make a tight (in a confined space) rotation while substantially staying in the same place, point-turns are used when there is limited space for turning. FIGS. 1a-1c are schematic illustrations demonstrating point-turns. Illustration 1a, 1a and 1e each show a vehicle (10) with a left driving element (e.g. left tracks LT) and right driving element (right tracks RT). The arrows on the side of the driving element indicate, by way of example, the direction of motion of each respective driving element. The broken line (SA) indicates a driving symmetry axis crossing the vehicle and extending from a left driving axis (L-DA) to a right driving axis (R-DA); e.g. at the center between the driving elements. The solid black circle indicates the rotation point of the vehicle (RP). The distance of each rotation point from the vehicle's driving elements is proportional to the velocities of the driving element on each side.

$V_1/V_2$ is proportional to $D_1/D_2$

Where:

$V_1$ is the velocity of a first driving element on a first side of the vehicle (e.g. velocity of right tracks RT in FIGS. 1a-1c).

$V_2$ is the velocity of a second driving element on a second side of the vehicle (e.g. velocity of left tracks LT in FIGS. 1a-1c).

$D_1$ is the distance of the rotation point from the first driving element (e.g. RT) axis.

$D_2$ is the distance of the rotation point from the second driving element (e.g. LT) axis.

FIG. 1a is an example where both the right tracks RT and the left tracks LT move at the same velocity (as indicated by the arrows on each side that have the same length), in which case the vehicle rotates about a rotation point located at the center of the symmetry axis at a substantially equal distance from the left driving element and the right driving element. The circle indicated by the broken line shows the turning radius (TR) of the tracks. The angular velocity of the tracks is a function of the linear velocity and the distance of the track from the turning point, according to the known relation v=rω, where v is the linear velocity r is the radius of turn and omega is angular velocity. In this example, as both tracks have an equal linear velocity, their angular velocity is equal as well.

FIG. 1b is an example where the velocity of the left tracks LT is zero and the velocity of the right tracks RT is greater than zero (as indicated by the absence of an arrow on the left side); in which case the vehicle rotates about a rotation point located on the left tracks, i.e. the distance from the rotation point to the left tracks is zero.

FIG. 1c is an example where the velocity of the left tracks LT is 20% of the velocity of the right tracks RT. In this case the vehicle rotates about a rotation point located at a distance from the right driving element RT which is five times its distance from the left driving element LT (the total length of SA is divided by the rotation point such that: D1=5*D2). The relative turning radiuses of the driving element on each side is also shown as $TR_{LEFT}$ and $TR_{RIGHT}$.

Proceeding to FIGS. 2Aa-2Ac that show schematic illustrations demonstrating rotation maneuver of a vehicle characterized by an asymmetric perimeter. FIG. 2Aa shows a vehicle having its front end pointing to the north, as indicated by the dark arrow on the back of the vehicle. It can be noted that the contour of vehicle 10 is characterized by a greater protrusion on the left side as compared to the right side. The asymmetric contour of the vehicle can result for example, from the structure of the vehicle (e.g. a vehicle carrying an implement protruding from one of its sides) or from a cargo being loaded onto the vehicle in an asymmetric manner. Assuming the vehicle needs to turn back to the direction it came from, the vehicle can only make a point-turn (or reverse backwards), or otherwise it would collide with the obstacles surrounding the vehicle (wall 11 and rock 12).

The vehicle can make a point-turn either to the left or to the right. If the point-turn is made to the left, the vehicle would not collide with the boulder 12 (FIG. 2Ab). If, on the other hand, the point-turn is made to the right, the vehicle would collide with the boulder 12 (as indicated by arrow 13 in FIG. 2Ac). In other examples, the vehicle may not be able to make a point-turn to either side without colliding with an obstacle, and in such a case it would be compelled to drive backwards (in reverse) until it reaches a position where it can rotate.

FIGS. 2Ba-2Bc are schematic illustrations demonstrating rotation maneuver of a vehicle characterized by an asymmetric perimeter. In illustration A (initial position) the vehicle is positioned with its front end pointing to the north, as indicated by the dark arrow on the back of the vehicle. In case the vehicle needs to rotate and face the direction indicated by arrow 14, the shorter maneuver for positioning the vehicle in the desired direction would be taking a right turn, while a longer maneuver for positioning the vehicle in the desired direction would be taking a left turn. However, as shown in FIG. 2Bb a right turn would result in a collision with boulder 12 while a left turn as shown in FIG. 213c would avoid such a collision. Thus, taking the left turn is preferable in this case.

The presently disclosed subject matter includes a computerized method and a control system mountable on a vehicle for autonomously controlling the vehicle and enabling to execute a point-turn while avoiding collision with nearby obstacles. More specifically, the proposed technique enables an autonomous vehicle, characterized by an asymmetric contour, to execute a collision free point-turn, in an area crowded with obstacles. The disclosed method enables execution of a point turn quickly, without requiring the vehicle to stop.

According to an aspect of the presently disclosed subject matter there is provided a computer implemented method of autonomously maneuvering a vehicle during a point-turn, the method comprising:

operating a scanning device from onboard the vehicle for scanning an area around the vehicle in a plurality of directions and generating real-time scanning output data;

operating a processing unit comprising at least one processing circuitry operatively connected to the scanning device, for:

generating, based on the real-time scanning output data, a range map including K set(s) of real-time range values, wherein K≥1; each set comprising a plurality of real-time range values, each range value in the set is determined from a given rotation-point of the vehicle towards a certain direction; each set of real-time range values having a corresponding set comprising a plurality of vehicle-contour range values; each vehicle-contour range value in the corresponding set is determined from the given rotation-point to the perimeter of the vehicle in a respective direction;

for each set of the K sets:
determining differences between real-time range values in the set and corresponding vehicle-contour range values in a corresponding set;
determining, based on the differences, conditions for executing a point-turn that avoids collision with nearby objects; and generating a point-turn command for causing the vehicle to execute a point-turn according to the point-turn conditions.

In addition to the above features, the method according to this aspect of the presently disclosed subject matter can optionally comprise one or more of features (i) to (xvi) listed below, in any technically possible combination or permutation:

i. Wherein the rotation point is on a symmetry axis of the vehicle;
ii. The method further comprising operating a scanning device from onboard the vehicle for scanning an area around the vehicle in a plurality of directions and generating the real-time scanning output data;
iii. The method further comprising executing the point turn command and causing the vehicle to turn accordingly.
iv. wherein K=1 and the rotation point is located at the center of a driving symmetry axis of the vehicle.
v. wherein K>1, and determining conditions for executing a point turn further comprises:
determining a selected rotation point from a plurality (K) of possible rotation points along a driving symmetry axis of the vehicle.
vii wherein the point-turn command includes data indicating a first velocity of a first driving element of the vehicle and a second velocity of a second driving element of the vehicle, on the opposite side relative to the first driving element, during the point-turn; the method further comprising:
determining the first velocity and the second velocity according to the selected rotation point and its distance from the first driving element and the second driving element.
vii. The method further comprising retrieving from a computer storage device on-board the vehicle one or more corresponding sets of vehicle-contour range values measured from a certain point along the driving symmetry axis of the vehicle.
viii. wherein the conditions include: whether a point turn is allowed or not; direction of an allowed point turn; and range of an allowed point turn.
ix. wherein each set of real-time range values and its corresponding set of vehicle-contour range values include range values corresponding to overlapping directions (overlapping angles).
x. The method further comprising executing the point-turn command for operating one or more vehicle control sub-systems and maneuvering the vehicle in a point-turn.
xi. wherein each of the K sets of real-time range values and their corresponding sets of vehicle-contour range values are plotted in a first histogram and a second histogram, respectively; and wherein determining differences between real-time range values in the set and corresponding vehicle-contour range values in a corresponding set is executed by shifting between relative positions of the first histogram and second histogram and comparing values in the two histograms in different relative positions.
xii. The method further comprising determining one or more sets of vehicle-contour range values based on scanning device readings reflected from the perimeter of the vehicle,
xiii. The method further comprising determining one or more sets of vehicle-contour range values based on image processing of a top-view image of the vehicle.
xiv. The method further comprising, while the vehicle is travelling, updating the vehicle-contour range values.
xv. The method further comprising implementing filtering on the real-time range values, and ignoring real-time range values which are greater than a certain threshold value.
xvi. The method wherein the vehicle is characterized by an asymmetric vehicle perimeter.

According to another aspect of the presently disclosed subject matter there is provided an unmanned vehicle, comprising:
a scanning device for scanning an area around the vehicle in a plurality of directions and generating real-time scanning output data;
a vehicle control sub-system configured to receive vehicle control instructions and control the vehicle in accordance with the instructions; and
at least one processor configured to:
generate, based on the real-time scanning output data, a range map including K sets of real-time range values, wherein K 1; each set comprising a plurality of real-time range values, each range value in the set is determined from a given rotation-point of the vehicle towards a certain direction; each set of real-time range values having a corresponding set comprising a plurality of vehicle-contour range values; each vehicle-contour range value in the corresponding set is a distance measured from the given rotation-point to the perimeter of the vehicle in a respective direction;
for each set of the K sets:
determine differences between real-time range values in the set and corresponding vehicle-contour range values in a corresponding set;
determine, based on the differences, conditions for executing a point-turn that avoids collision with nearby objects;
generate a point-turn command for causing the vehicle to execute a point-turn according to the point-turn conditions; and
the vehicle control sub-system is configured to execute the point-turn command and control the vehicle to turn accordingly.

According to another aspect of the presently disclosed subject matter there is provided a system mountable on an unmanned vehicle, comprising:
at least one processor operatively connected to a scanning device;
the scanning device is configured to scan an area around the vehicle in a plurality of directions and generate real-time scanning output data;
the at least one processor configured to:
generate, based on the real-time scanning output data, a range map including K sets of real-time range values, wherein K≥1; each set comprising a plurality of real-time range values, each range value in the set is determined from a given rotation-point of the vehicle towards a certain direction; each set of real-time range values having a corresponding set comprising a plurality of vehicle-contour range values; each vehicle-contour range value in the corresponding set is a distance measured from the given rotation-point to the perimeter of the vehicle in a respective direction;
for each set of the K sets:
determine differences between real-time range values in the set and corresponding vehicle-contour range values in a corresponding set;
determine, based on the differences, conditions for executing a point-turn that avoids collision with nearby objects;
generate a point-turn command for causing the vehicle to execute a point-turn according to the point-turn conditions; and
transmit the point-turn command to a vehicle control sub-system where the command is executed.

According to another aspect of the presently disclosed subject matter there is provided a computer program product comprising a computer readable storage medium retaining program instructions, the program instructions, when read by a processor, cause the processor to perform a method of autonomously maneuvering a vehicle during a point-turn, comprising:
receiving real-time scanning output data; the real-time scanning output data is generated by a scanning device from onboard the vehicle for scanning an area around the vehicle in a plurality of directions;
generating, based on the real-time scanning output data, a range map including K sets of real-time range values, wherein K≥1; each set comprising a plurality of real-time range values, each range value in the set is determined from a given rotation-point of the vehicle towards a certain direction; each set of real-time range values having a corresponding set comprising a plurality of vehicle-contour range values; each vehicle-contour range value in the corresponding set is a distance measured from the given rotation-point to the perimeter of the vehicle in a respective direction;
for each set of the K sets:
determining differences between real-time range values in the set and corresponding vehicle-contour range values in a corresponding set;
determining, based on the differences, conditions for executing a point-turn that avoids collision with nearby objects; and
generating a point-turn command for causing the vehicle to execute a point-turn according to the point-turn conditions.

In addition, the system, unmanned vehicle and computer program produce, of the presently disclosed subject matter can optionally comprise one or more of features (i) to (xvi) listed above, mutatis mutandis, in any technically possible combination or permutation.

BRIEF DESCRIPTION OF THE DRAWINGS

In order to understand the invention and to see how it can be carried out in practice, embodiments will be described, by way of non-limiting examples, with reference to the accompanying drawings, in which:

FIGS. 1a-1c shows schematic illustrations in top-view demonstrating relative positions of rotation point of a vehicle;

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "operating", "generating", "determining", "processing", "executing", "comparing" or the like, refer to the action(s) and/or process(es) of a computer that manipulate and/or transform data into other data, said data represented as physical, such as electronic, quantities and/or said data representing the physical objects.

The terms "processing unit" (e.g. processing unit 116 described below with reference to FIG. 3), "computer", "control unit", or the like should be expansively construed to include any kind of hardware electronic device with data a processing circuitry that includes one or more computer processors (e.g., a Central Processing Unit (CPU), a microprocessor, an electronic circuit, an Integrated Circuit (IC), firmware written for or ported to a specific processor such as digital signal processor (DSP), a microcontroller, a field programmable gate array (FPGA), an application specific integrated circuit (ASIC), etc.) and is capable of executing computer instructions as disclosed herein below (e.g. loaded on a computer memory operatively connected to the processing circuitry).

Figure 3:
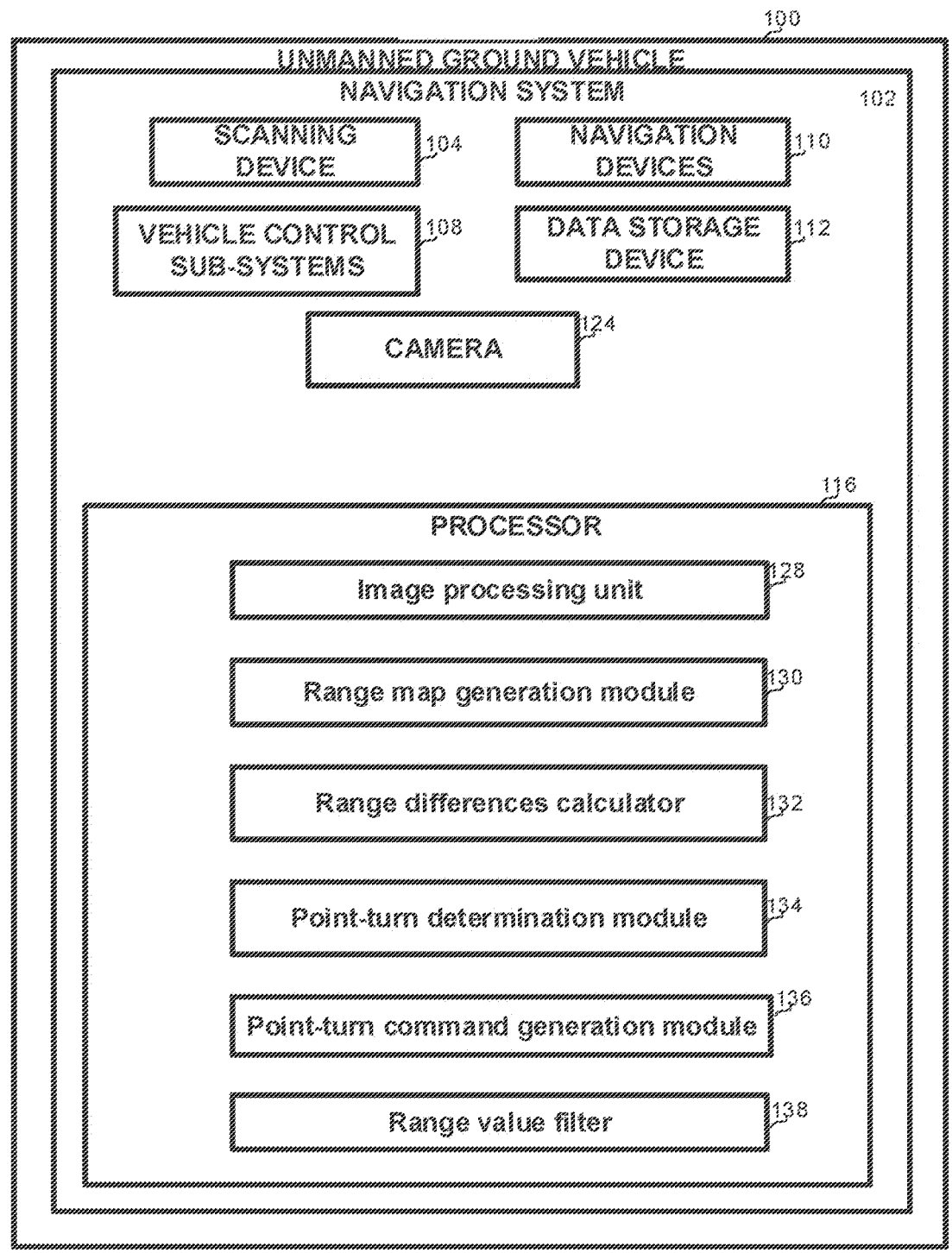
FIG. 3 is a block diagram of a UGV with an autonomous control unit, in accordance with certain examples of the presently disclosed subject matter.

FIG. 3 illustrates a general schematic diagram of components of the disclosed system in accordance with some examples. Elements in FIG. 3 can be made up of a combination of software and hardware and/or firmware that performs the functions as defined and explained herein. It should be understood that in other examples of the presently disclosed subject matter, the system may comprise fewer, more, and/or different elements than those shown in FIG. 3. Accordingly, the specific structure shown in FIG. 3 is provided by way of example and should not be construed as limiting. For example, processing unit 116 can be otherwise divided into a different combination of modules than those shown in FIG. 3 for performing the same operations.

Some operations in accordance with the teachings herein may be performed by a computer specially constructed for the desired purposes or by a general-purpose computer specially configured for the desired purpose by a computer program stored in a computer readable storage medium.

The term "scanning device" as used herein should be expansively construed to include any kind of device configured to determine a range from the device to a specific direction relative to the device. Examples of scanning devices include, but are not limited to: laser scanners (including LIDAR), RADAR, images sensor, sonar, etc. A scanning device can scan for example, 360° on a plane surrounding the device, or at some other smaller scanning angle (e.g. 180°). Alternatively, the scanning device can scan a sphere or part thereof around the scanning device. In some examples, a scanning device can provide information for generating a 3 dimensional map of the scanned area. In some embodiments, in order to save resources, a 2.5 dimensional map may be generated, as detailed below.

The term "substantially" is used herein to imply the possibility of variations in values within an acceptable range. According to one example, the term "substantially" is used to imply a variation of 10% over or under a prescribed value. According to one example, the term "substantially" is used to imply a variation of 5% over or under a prescribed value. According to one example, the term "substantially" is used to imply a variation of 2.5% over or under a prescribed value. According to one example, the term "substantially" is used to imply a variation of 1.25% over or under a prescribed value.

Reference is now made to FIG. 3, showing a schematic block diagram of a navigation system 102 mounted on a UGV 100, in accordance with some examples of the presently disclosed subject matter.

As illustrated, system 102 can be installed on UGV 100. It will be appreciated that system 102 can comprise components, some of which may also serve purposes other than those described herein, and that components of system 102 may be located at different places on UGV 100.

Navigation system 102 can comprise or be otherwise operatively connected to one or more than one scanning device 104 mounted on-board the vehicle configured to scan an area surrounding the vehicle, and provide scanning output data. Scanning output data includes information indicative of the location of objects relative to the vehicle in a multiplicity of directions around the vehicle. As the vehicle travels through an area, the scanning device continuously scans the area surrounding the vehicle, and a range map is dynamically generated based on the scanning output data, indicating the real-time position of the vehicle relative to objects in the traversed area.

System 102 can further comprise or be otherwise operatively connected to various navigation devices 110 such as inertial navigation system (INS) and GPS receiver.

System 102 can further comprise or be otherwise operatively connected to vehicle control sub-system 108 that includes for example, steering control unit for controlling the steering of the vehicle, gear control unit for control the gear of the vehicle during driving, throttle control unit for controlling accelerating and decelerating, etc. Vehicle control sub-system 108 is configured in some examples to receive vehicle navigation instructions and in response generate instructions (e.g. steering commands) for controlling the movement of the UGV 100 according to the navigation instructions.

System 102 can further comprise or be otherwise operatively connected to one or more computer data storage devices 112 for storing information such as maps (including the range map), information on obstacles, navigation instructions, or the like. As explained further below, data storage devices 112 can be also used for storing vehicle-contour range values.

Navigation system 102 further comprises or is otherwise operatively connected to one or more processing units for controlling and executing various operations, as disclosed herein. Each processing unit comprises a respective processing circuitry comprising at least one computer processor which can be operatively connected to a computer-readable storage device having computer instructions stored thereon to be executed by the computer processor.

According to one example, different elements in system 102 can be implemented each as a dedicated processing circuitry comprising dedicated computer processor and computer data-storage for executing specific operations. Alternatively or additionally, one or more elements can be part of a common processing circuitry configured to execute operations according to instructions stored in the elements.

For example, system 102 can comprise processing unit 116 configured to execute several modules, which can be implemented in some examples as instructions stored on a non-transitory computer-readable medium. For illustrative purposes, such modules are shown and referred to herein as comprised in the processor. Notably, in some examples, part of the processing can be performed by a computer located remotely from the UGV and configured to receive input data from system 102 and provide the processing output to the system over a communication link.

Figure 4A:
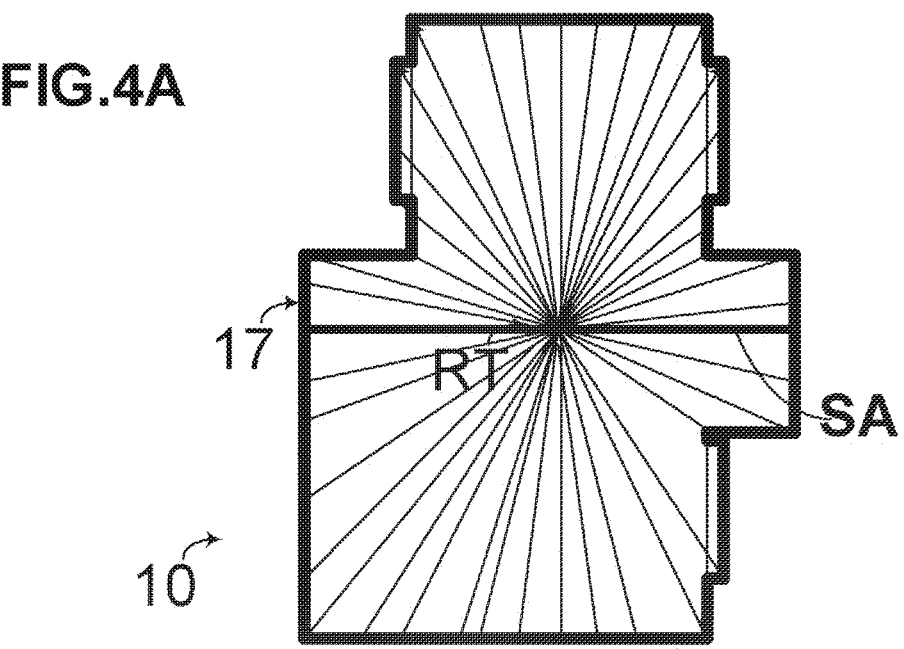
FIGS. 4a and 4b are schematic illustrations in top-view of a vehicle with asymmetric contours and difference between vehicle-contour range values as a function of the rotation point, in accordance with certain examples of the presently disclosed subject matter.
Figure 4B:
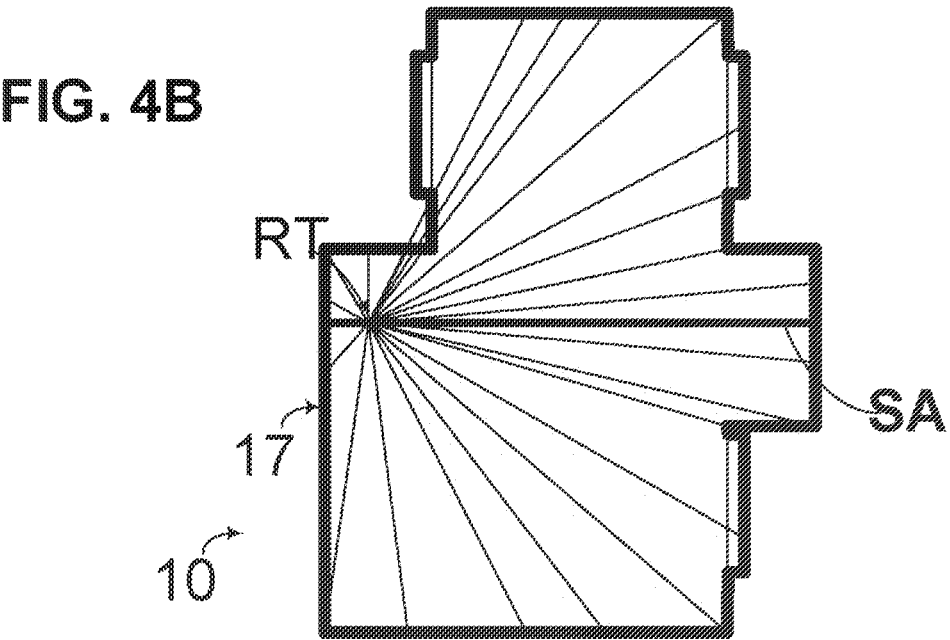

As mentioned above, computer storage device 112 in navigation system 102 can be used for storing vehicle-contour range values. "Vehicle-contour range values" are ranges extending from a certain (potential) rotation point of the vehicle towards the edges of the vehicle, FIGS. 4*a* and 4*b* are a schematic illustrations showing two examples of vehicle 10 from top-view and a multiplicity of lines extending from a rotation point RT towards the edges of the vehicle (marked by bold line 17). FIG. 4*a* is an example where the rotation point is located at the center of the driving symmetry axis and FIG. 4*b* is an example where the rotation point RT is located off-center of the driving symmetry axis. Each line indicates a distance from a rotation point to a vehicle edge in a specific direction. The number of ranges can vary according to the desired angular resolution, e.g. 180 range values for a 2° angular resolution, 360 range values for a 1° resolution, 720 range values for 0.5° resolution (range determined for every half an angle), and so forth. As explained above, with reference to FIG. 1, the rotation point is located somewhere on the symmetry axis of the left and right driving element. The exact location of a rotation point along the axis depends on the relative velocity of a driving element on one side and a driving element on the opposite side. Or, in other words, given a certain velocity of a driving element on one side and a certain velocity of a driving element on the opposite side, the vehicle rotates around a certain rotation point.

The vehicle-contour range values depend on the specific geometrical characteristics of each vehicle and therefore differ in different types of vehicles. The vehicle-contour range values can also depend on auxiliary equipment (e.g. implements or cargo) loaded on the vehicle if such equipment protrudes beyond the edges of the vehicle.

According to some examples, processing unit 116 is configured to receive the scanning output data and generate a range map (e.g. by range map generation module 130) comprising at least one set of plurality of real-time range values (also referred to herein as "real-time obstacle range values"). Each real-time range values is a range measured from a certain rotation point in a certain direction around the vehicle, possibly indicating a nearby obstacle.

According to further examples, processing unit 116 is configured to calculate range difference values (e.g. by range differences calculator 132). As used herein the term "range difference values" refers to the differences between the real-time range values and their corresponding vehicle-contour range values, A more detailed description of the range map generation and the calculation of the range difference values is provided below with reference to FIGS. 5-8.

When a vehicle characterized by an asymmetric shape makes a point-turn, the distances between the vehicle edges and the surrounding objects change with the turn. This is also true for any vehicle that makes a point-turn about a rotation point that is not at the center of the driving symmetry axis.

According to some examples disclosed herein, while the vehicle is maneuvering through an area, processing unit 116 is configured to calculate in real-time, the differences between real-time range values determined based on real-time scanning output and the vehicle contour range values, and determine the difference range values.

Processing unit 116 can be further configured (e.g. by point-turn determination module 134) to determine, based on the calculated differences, conditions for making a point-turn.

Processing unit 116 can be further configured (e.g. by point-turn command generation module 136) to generate a point-turn command and transmit the command to the vehicle control sub-system where it is executed.

Figure 5:
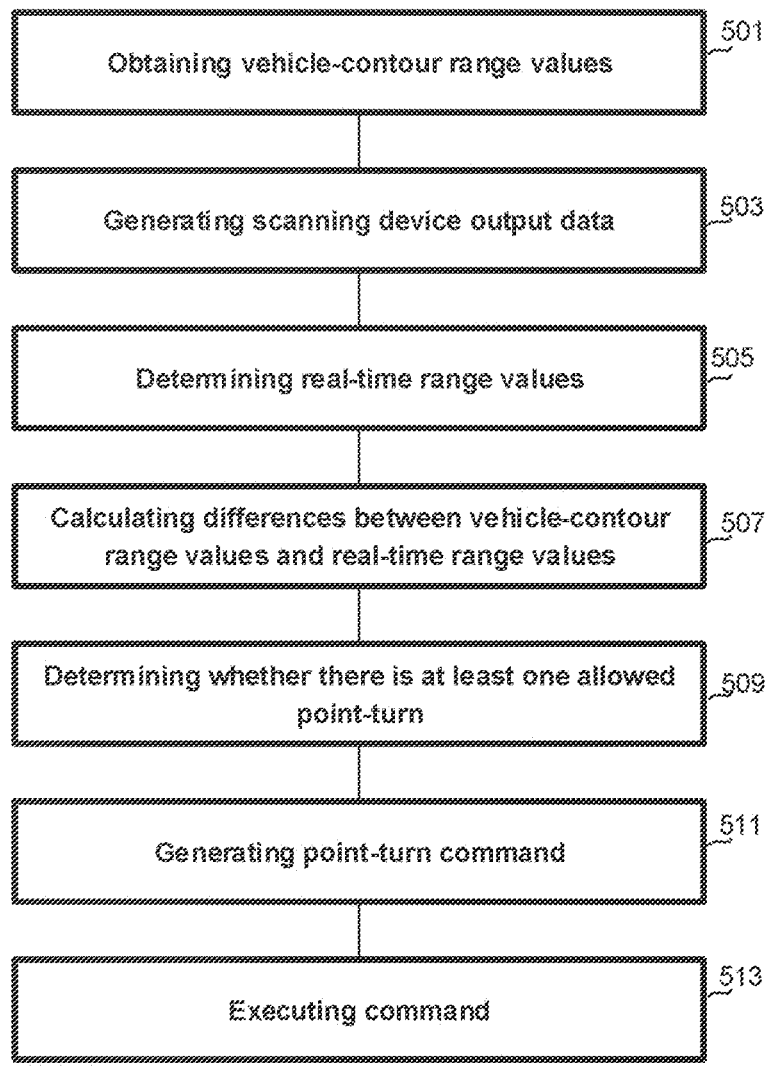
FIG. 5 is a flow-chart of operations carried out in accordance with certain examples of the presently disclosed subject matter.

Reference is now made to FIG. 5, showing a flowchart of operations carried out according to some examples of the presently disclosed subject matter. Operations are described below with reference to elements in FIG. 3, however this is done by way of example only and should not be construed as limiting, and it should be understood that other system designs providing the same functionality are contemplated within the scope of this disclosure.

At block 501 vehicle-contour range values are obtained and stored in a computer data storage device in system 102. This stage can be executed, in some examples, as a preparatory stage before operation of the UGV and/or execution of a point-turn. The vehicle-contour range values can be determined by measuring the ranges from a rotation point RP to the edges of the vehicle in a multiplicity of directions. In some examples, vehicle-contour range values can be uploaded (e.g. from a remote library over a communication link) and stored in system 102 in storage device (112). The library can include, for example, vehicle-contour range values of various types of vehicles and provide the needed information to system 102 when installed on a vehicle of a certain type.

Furthermore, vehicle-contour range values of a given vehicle can include a plurality (denoted by 'K') of sets of values, each set corresponding to a rotation point at different locations along the driving symmetry axis. Thus, K can be any number equal to or greater than 1. A greater number of optional rotation points (i.e. greater K value) increases the flexibility when maneuvering the vehicle, as it provides greater possibilities when performing a point-turn, and a greater ability to adapt to the real-time environment.

According to some examples, system 102 is configured to determine the vehicle-contour range values. To this end, processer 116 can be configured to receive scanning output data (including for example, output data generated by a laser scanner or a camera), process the output data, determine the vehicle range values, and store the vehicle range values in the data storage device.

According to one example, a reflective material can be placed around the edges of the vehicle (e.g. along line 17 in FIG. 4) and a scanning device 104 (e.g. laser or LIDAR) positioned on board the vehicle can be used for determining the contour range values based on the reflections received from the edges. A set of vehicle contour range values can be determined for each of one or more rotation points along the driving symmetry axis of the vehicle, based on the offset location of the scanning device and a respective rotation point, using geometrical principles.

Figure 9:
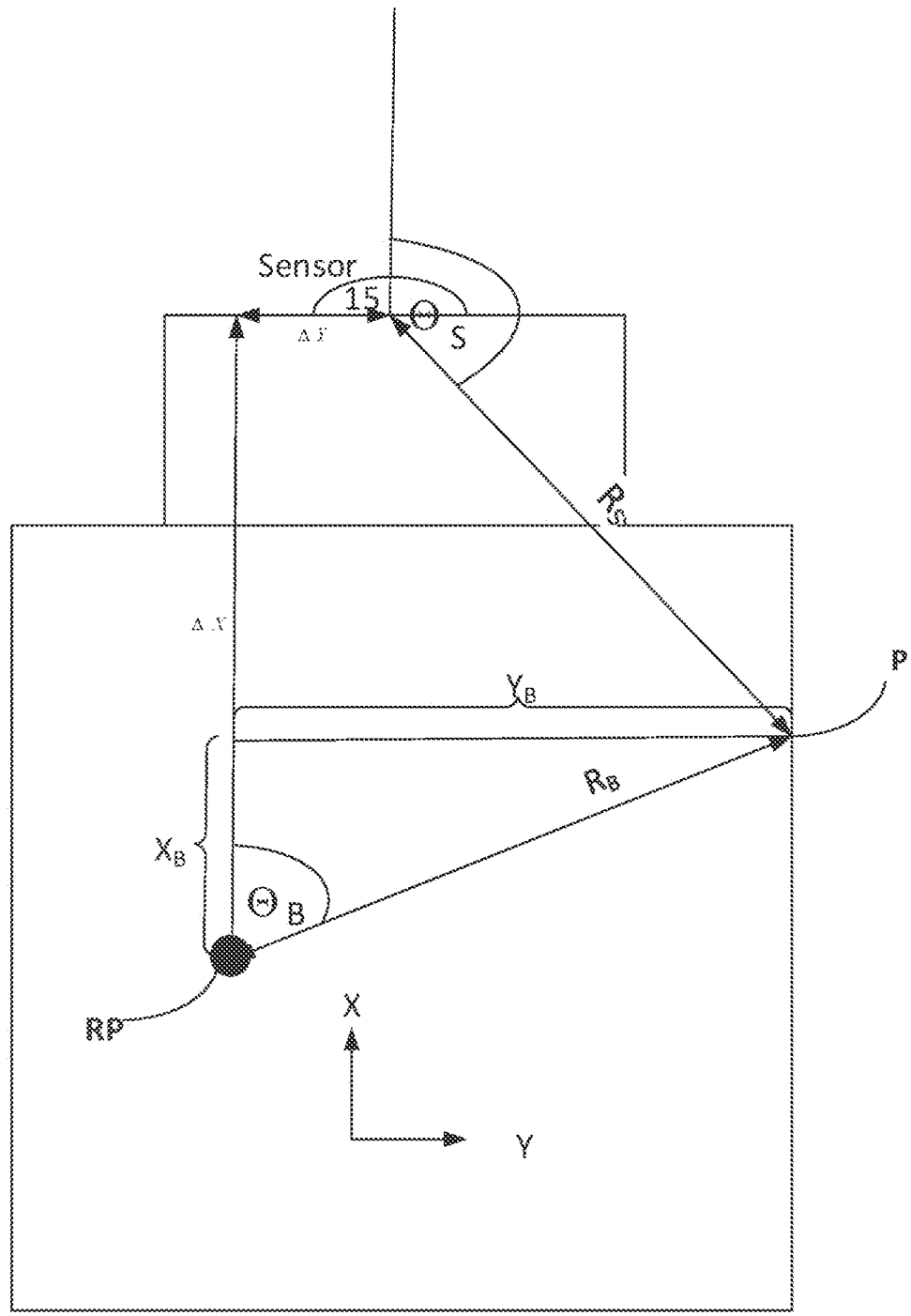
FIG. 9 demonstrates calculation of a range from a rotation point RP to a point P on vehicle edge based on range from sensor to point P, accordance with certain examples of the presently disclosed subject matter.

FIG. 9 demonstrates calculation of a range ($R_B$) from rotation point RP to a point P on vehicle edge based on range from sensor 15 to point P.

To this end the following equations can be applied:

$$X_B = R_s \cdot \cos\Theta_s + \Delta X$$
$$Y_B = R_s \cdot \sin\Theta_s + \Delta Y$$
$$R_B = \sqrt{X_B^2 + Y_B^2}$$
$$\Theta_B = \arctan2(Y_B, X_B)$$

Angle $\Theta_B$ is the angle at the rotation point between the longitudinal axis of the vehicle and point P.

According to some examples, distances $\Delta X$ and $\Delta Y$, which are the right angle distances between the RP and the sensor, can be pre-stored (e.g. in a computer storage device 112) and be made available to processing unit 116. If more than one optional rotation point is used for each rotation point a respective $\Delta X_K$ and $\Delta Y_K$ can be stored and made available during execution of a point turn.

In another example, an image of the vehicle can be taken from a top-view point in order to obtain an image showing the perimeter of the vehicle. Image processing can be then implemented on the image for determining vehicle-contour range values. The image can be captured by a camera positioned above the vehicle. For example, a camera (124) can be installed on a pole or antenna onboard the vehicle to provide the required vantage point. Alternatively or additionally, a drone or some other airborne device carrying a camera can be used to fly over the vehicle and capture the image. Other methods can also be used e.g. using a camera mounted on a crane positioned above the vehicle or determining vehicle-contour range values during manufacturing and/or assembly of the UGV.

According to this example, system 102 can comprise an image processing unit (e.g. image processor 128 in processing unit 116) configured for processing the image and determining the vehicle-contour range values therefrom.

In some further examples, vehicle-contour range values are repeatedly (e.g. periodically) updated in order to monitor for any changes in the contour of the vehicle, e.g. in case cargo is removed or added, thus changing the outline of the vehicle. To this end, the process of determining vehicle-contour range values can be initiated while the vehicle is operating in the field, either responsive to an explicit command or autonomously e.g. in response to a certain event or as a periodically repeating process.

As mentioned above and demonstrated in FIG. 4), vehicle-contour range values of a given vehicle can include a plurality of sets of values, where each set corresponds to a rotation point located at different locations along the driving symmetry axis.

At block 503, as the vehicle travels through the area, the scanning device is operated to scan an area around the vehicle (perform a scanning operation) and generate scanning output data, comprising readings of distances from the UGV to objects in multiple directions. The scanner is operated to provide the readings repeatedly, at a rate depending, inter alia, on the device capabilities, user settings, or the like. The readings may be received for a full cycle (360°) around the device, or for a smaller angle, such as 180°, 270°, or the like. The readings may be received at a predefined resolution, such as every 0.5°, every 1°, every 2°, or the like, horizontally and vertically. It will be appreciated that scanning output data may be received from multiple scanners operatively connected to the UGV.

The scanning output data is transmitted to a computer processor (e.g. processing unit 116), where it is processed. At block 505, as part of the processing, a range map comprising the real-time range values are determined (e.g. by range map generation module 130). These values are calculated based on the scanning device output data and the location of each rotation point relative to that of the scanning device. Namely, the raw range values obtained by the scanning device are transformed, using geometrical principles, for calculating the range values from various rotation points along the driving symmetry axis.

Figure 10:
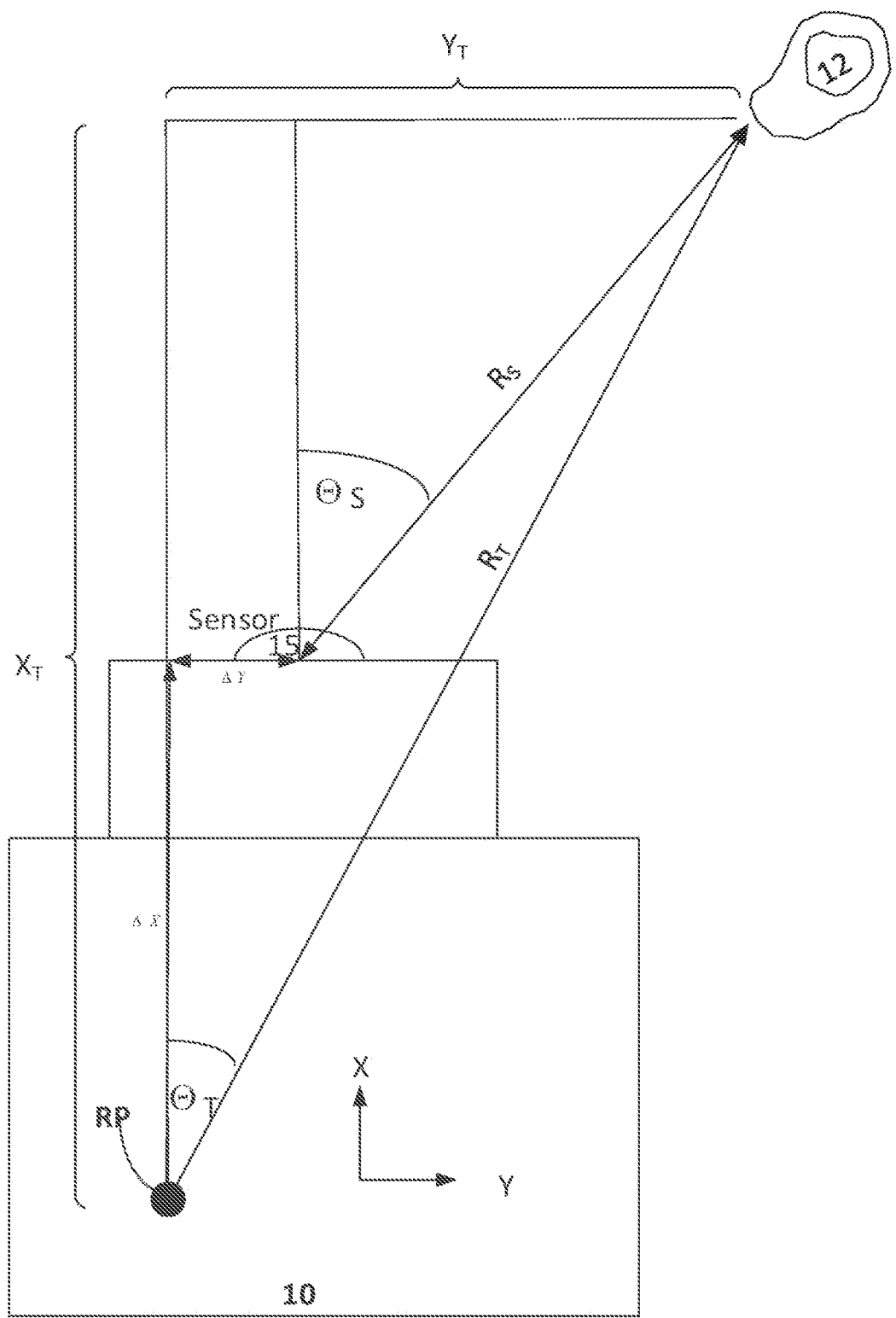
FIG. 10 demonstrates calculation of a range from a rotation point RP to an object based on range from sensor to the object, in accordance with certain examples of the presently disclosed subject matter.

FIG. 10 demonstrates calculation of range ($R_T$) from rotation point RP to detected obstacle 12 based on range from sensor 15 to obstacle 12.

To this end the following equations can be applied:

$$X_T = R_s \cdot \cos\Theta_s + \Delta X$$
$$Y_T = R_s \cdot \sin\Theta_s + \Delta Y$$
$$R_T = \sqrt{X_T^2 + Y_T^2}$$
$$\Theta_T = \arctan2(Y_T, X_T)$$

Angle $\Theta_T$ is the angle at the rotation point between the longitudinal of the vehicle and the detected object.

As mentioned above, distances $\Delta X$ and $\Delta Y$, which are the right angle distances between the RP and the sensor, can be pre-stored in a computer storage device 112 and made accessible to processing unit 116. If more than one optional rotation point is used for each rotation point, a respective $\Delta X_K$ and $\Delta Y_K$ can be stored and made available.

At block 507, differences between real-time range values and vehicle-contour range values are determined (e.g. by range differences calculator 132 in processioning unit 116). In some examples, the difference between each one (denoted i) of a plurality of real-time range values (denoted M) and each one (denoted j) of a plurality of vehicle-contour range values (denoted N) is calculated. This calculation provides M×N range-difference values. Assuming; for example, both M and N equal 360, the result would be $360^2$ range-difference values.

The difference between a given real-time range value at an angle $\Theta_{Ti}$ (indicative of a range between a rotation point $RT_d$ and a detected object) and a corresponding vehicle-contour range value at an angle $\Theta_{Bi}$ (indicative of a range between the same rotation point $RT_d$ and the vehicle edge) is determined.

In some examples, the range values in a set of real-time range values and its corresponding set of vehicle-contour range values (both measured with respect to the same rotation point) are measured in overlapping angle (i.e. $\Theta_{Ti}=\Theta_{Bi}$) in order to enable simple comparison between the values in the two sets. For example, each set of real-time range values may include 360 values measured in 1° resolution, that coincide with azimuth 0 (North). In other examples, some difference (e.g. 0.25-0.5 of a degree) between angle in the two sets may be allowed (i.e. $\Theta_{Ti} \cong \Theta_{Bi}$).

In some examples, a filtering process is executed (e.g. by range value filter 138 in processing unit 116), where the real-time range values are filtered and only range values which are below a certain threshold value (denoted M', where M'≤M) are compared with the vehicle-contour range values. The threshold is selected such that real-time range values which are above the threshold do not indicate a collision risk during a point-turn, and, accordingly, can be ignored. The filtering helps to reduce the processing intensity and time of the calculation.

As mentioned above, vehicle-contour range values of a given vehicle can include a plurality of sets of values. Thus, in some examples, there may be K sets of vehicle-contour range values, each set corresponding to a rotation point located at different locations along the symmetry axis giving a total of M×N×K (or M'×N×K) range-difference values. Notably, in some cases (e.g. where the velocity of the driving elements on the two side of the vehicle is always equal) and only a single rotation point is possible, M×N range-difference values or less are calculated.

Figure 2A:
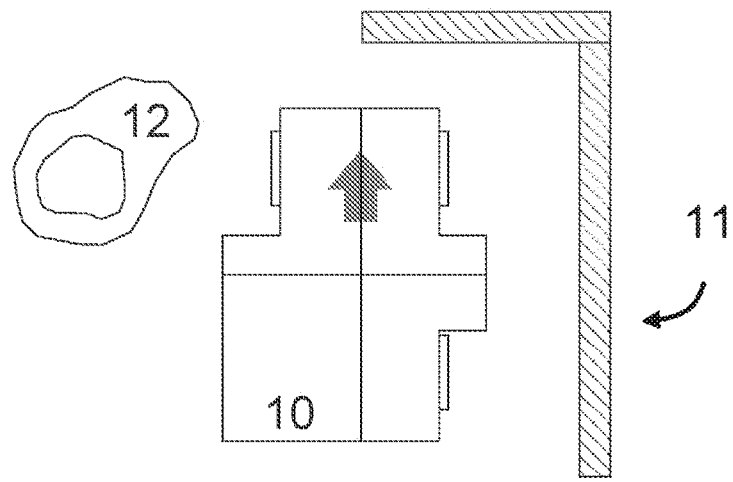
FIGS. 2Aa-2Ac show schematic illustrations in top-view demonstrating a point-turn, in accordance with certain examples of the presently disclosed subject matter.
Figure 2A:
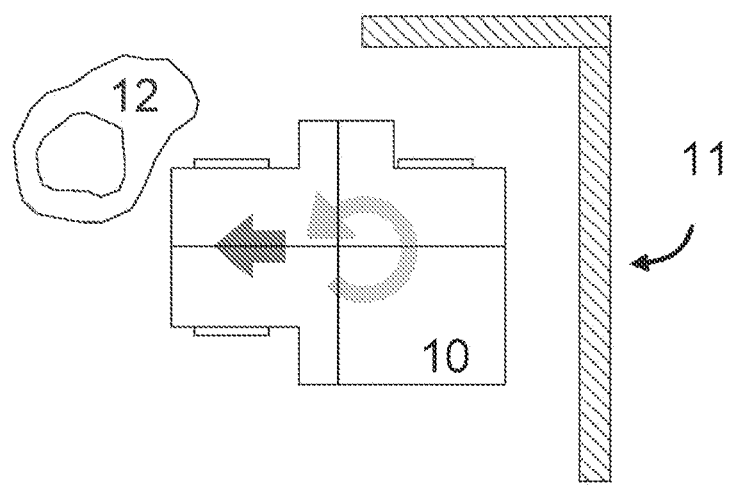
Figure 2A:
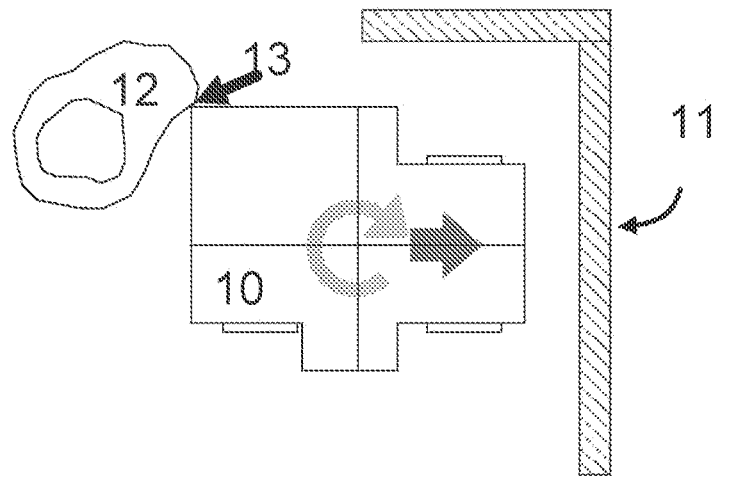
Figure 2B:
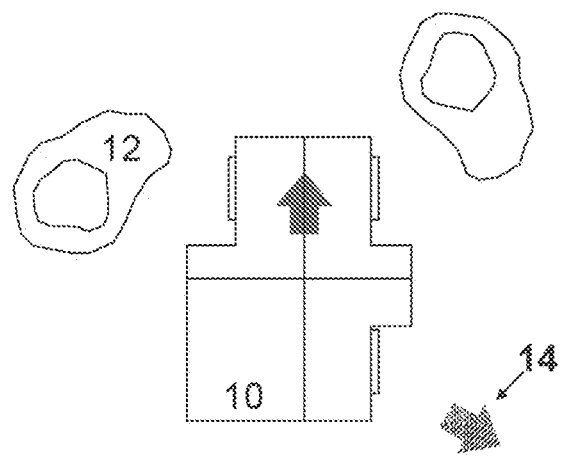
FIGS. 2Ba-2Bc show schematic illustrations in top-view demonstrating a point-turn, in accordance with certain examples of the presently disclosed subject matter.
Figure 2B:
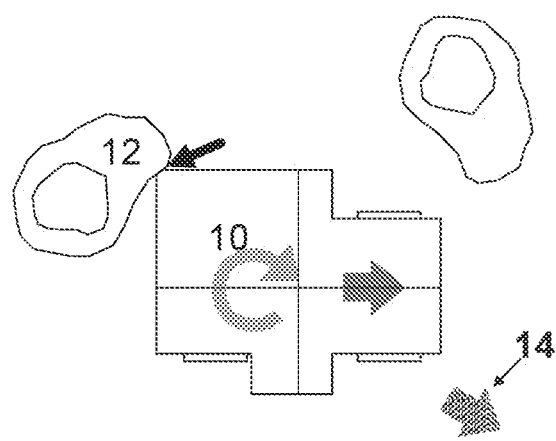
Figure 2B:
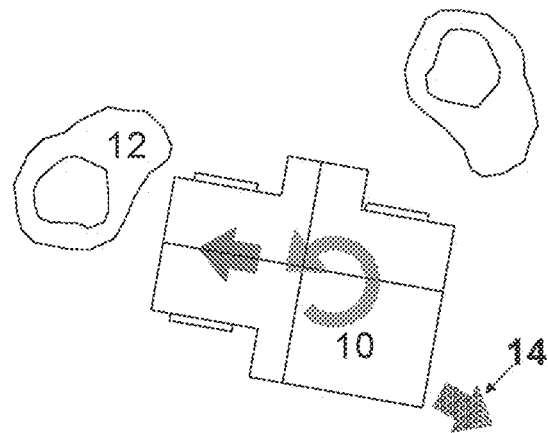

At block 509 it is determined (e.g. by point turn determination module 138) whether there is an allowed point-turn (or more than one). Range-difference values are processed in order to determine whether a point-turn is allowed, e.g. whether a point-turn can be made without colliding into an obstacle or without a considerable risk of collision. Collision risk can be determined based on the range difference. If the range difference is lower than a certain threshold, the rotation is limited due to the risk of collision. In cases where it is determined that a point-turn cannot be made without causing the vehicle to collide with an obstacle, instructions to move in reverse can be generated. In this stage the conditions for making an allowed point-turn are determined. Such conditions include a point-turn direction, i.e. to which of the sides, left or right, the point-turn can be made. The conditions can further include allowed point-turn range to each side (e.g. in radians). In general, the shorter turn that would bring the vehicle to point in a desired azimuth is preferred. However, as exemplified above with reference to FIG. 2Ba-2Bc in some cases, the shorter turn may cause collision (or may include a greater risk of collision), and accordingly in some cases, the longer turn may be selected instead. System 102 further determines the allowed angular range of the point-turn if only a partial turn is possible without collision (or a considerable risk of collision).

In some examples, acceptable point-turn conditions can be determined with respect to K different sets of vehicle-contour range values, each set corresponding to a certain rotation point. Based on the processing of different potential rotation points, a rotation point is selected. For example, all rotation points out of the K points are analyzed and a subset of rotation points that comply with the safety conditions (provide no collision risk or an acceptable collision risk determined for example, based on the calculated distance of the vehicle from the detected obstacles during a respective point-turn), is selected. A point-turn is then selected from the subset of point-turns. For example, this may be a point-turn requiring the shortest driving distance from out of all point-turns in the subset or the point-turn closest to the center of the symmetry axis SA.

Attention is now drawn to FIGS. 6a, 6b, 7a, 7b, 8a and 8b that show examples of a comparative histograms used according to some examples in the processing executed by system 102 as disclosed herein. In some examples, range difference calculator 132 can be configured to generate the histograms as described below, and perform the respective calculations based on the histograms.

Figure 6A:
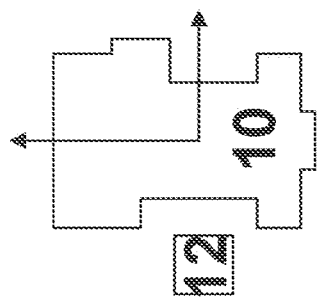
FIGS. 6a-6b demonstrate a first schematic illustration of comparative histograms, in accordance with certain examples of the presently disclosed subject matter.
Figure 6B:
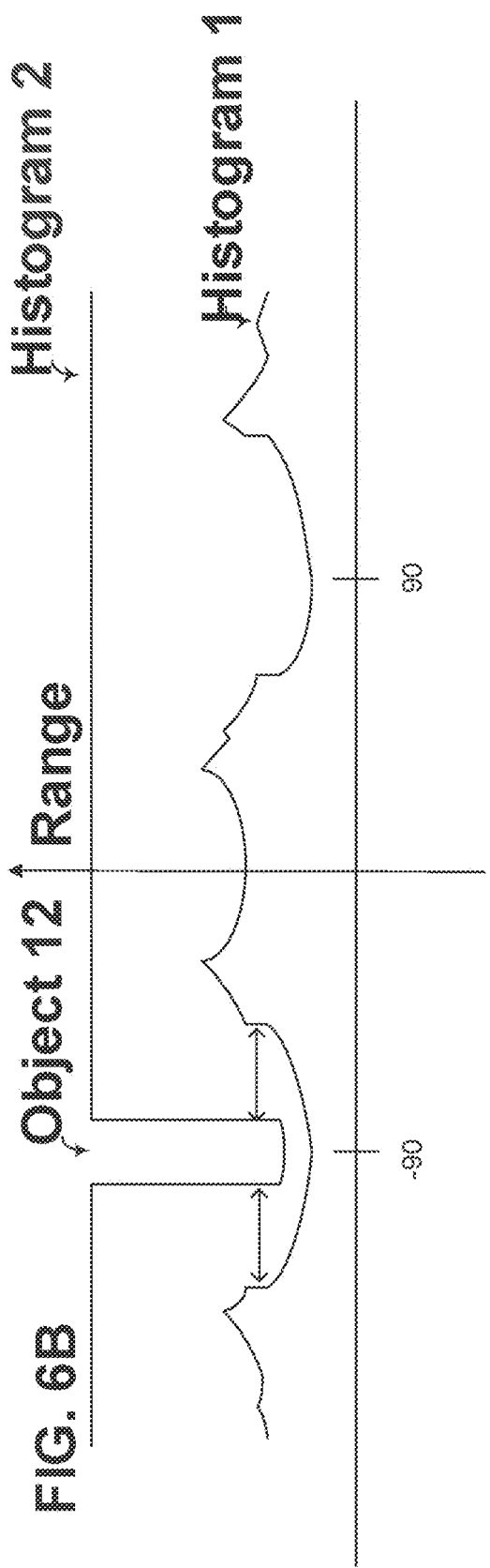

FIG. 6a shows a schematic illustration of an example of a vehicle 10 next to an obstacle 12. The arrows on the vehicle illustrate an imaginary coordinate system with its origin located at a rotation point. FIG. 6b shows a graphical representation of the vehicle-difference values using two histograms. The x axis plots the directions surrounding the vehicle. Assuming 360° resolution is used, the x axis values ranges for example, from −180 to 180. The y axis plots the range measured at each point i.e. each direction around the vehicle. Histogram 1 shows the vehicle-contour ranges and histogram 2 shows real-time ranges determined based on scanning device readings. By shifting one histogram relative to the other, the range-difference values of each possible pair of points from the two histograms can be readily determined. For example, histogram 1 can be shifted relative to histogram 2. In the illustrated example, the position of obstacle 12 relative to the vehicle is indicated in histogram 2. As can be seen from the illustration, if the vehicle makes a left or a right turn beyond the range indicated by the two horizontal arrows, the two histograms will overlap indicating that a collision will occur. Accordingly, in this case the vehicle can make a turn only within the limits indicated by the horizontal arrows, which are indicative of the allowed angle-range in which the turn can be made. Notably, as there is only one obstacle, most of histogram 2 show a straight line. By implementing filtering to the values of histogram 2 (ignoring real-time range values indicative of distance greater than a certain threshold), it can be determined that only a small area of histogram 2 should be compared with histogram 1.

Figure 7A:
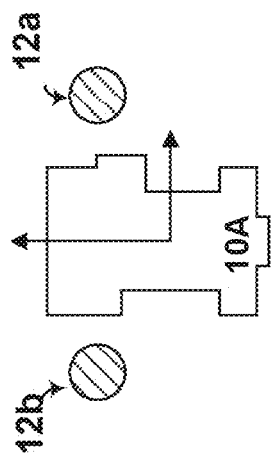
FIGS. 7a-7b demonstrate a second illustration of comparative histograms, in accordance with certain examples of the presently disclosed subject matter.
Figure 7B:
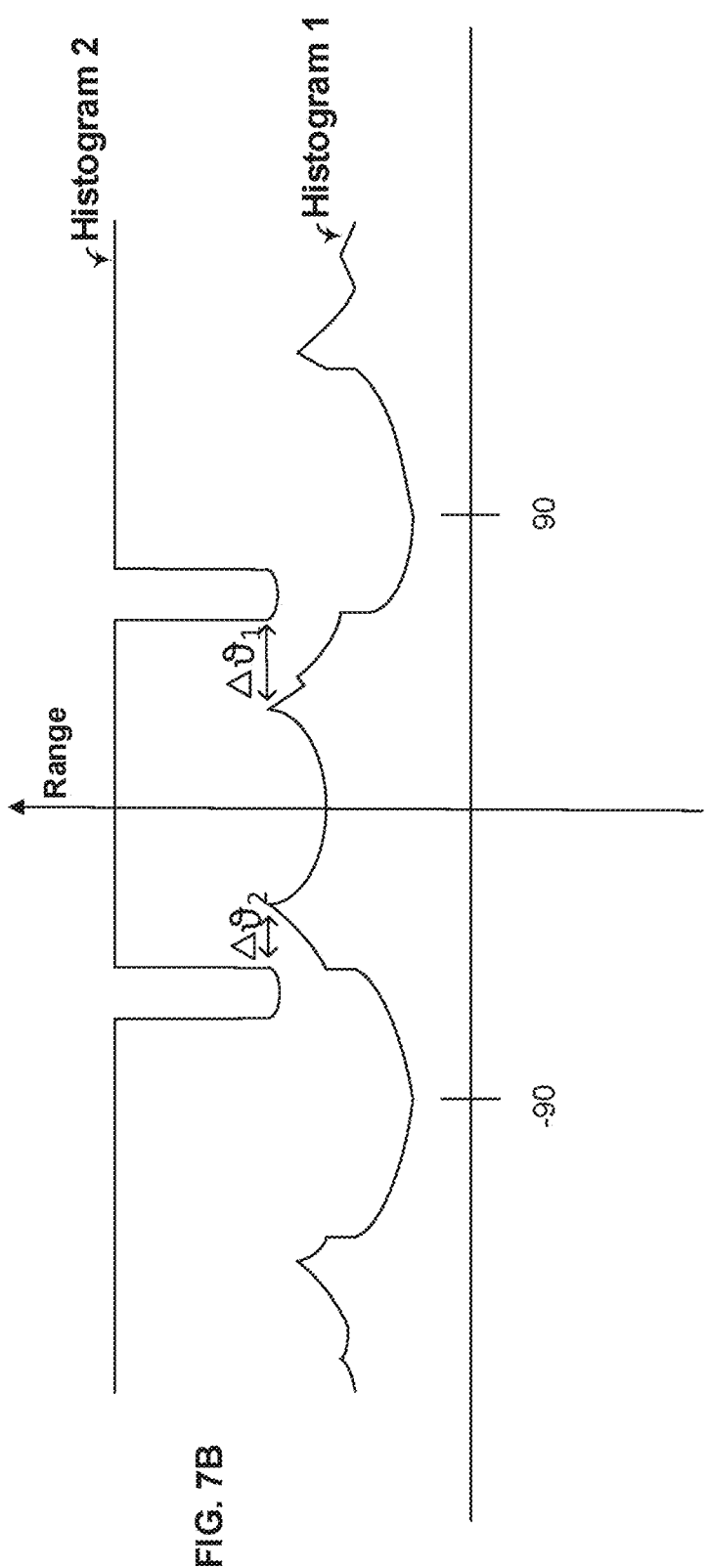

Attention is now turned to FIG. 7a that shows another schematic illustration of an example of a vehicle 10a next to two obstacles 12a and 12b. The position of the two obstacles 12 relative to the vehicle is indicated in histogram 2. As before, it is apparent from the two histograms FIG. 7b (or more precisely from shifting the histogram one with respect to other) that a left or a right turn beyond the range indicated by the two horizontal arrows would cause a collision with one of the obstacles. Accordingly, in this case the vehicle can make a turn which is limited to the angle range indicated by the horizontal arrows.

In case of K sets of vehicle-contour range values, a respective histogram can be generated for each set and compared with a respective histogram of the real-time ranges values.

Figure 8A:
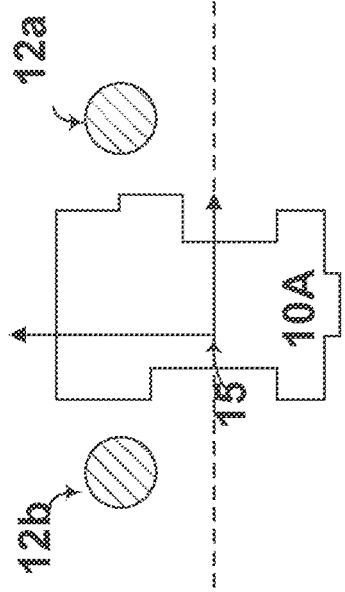
FIGS. 8a-8b demonstrate a third illustration of comparative histograms, in accordance with certain examples of the presently disclosed subject matter.
Figure 8B:
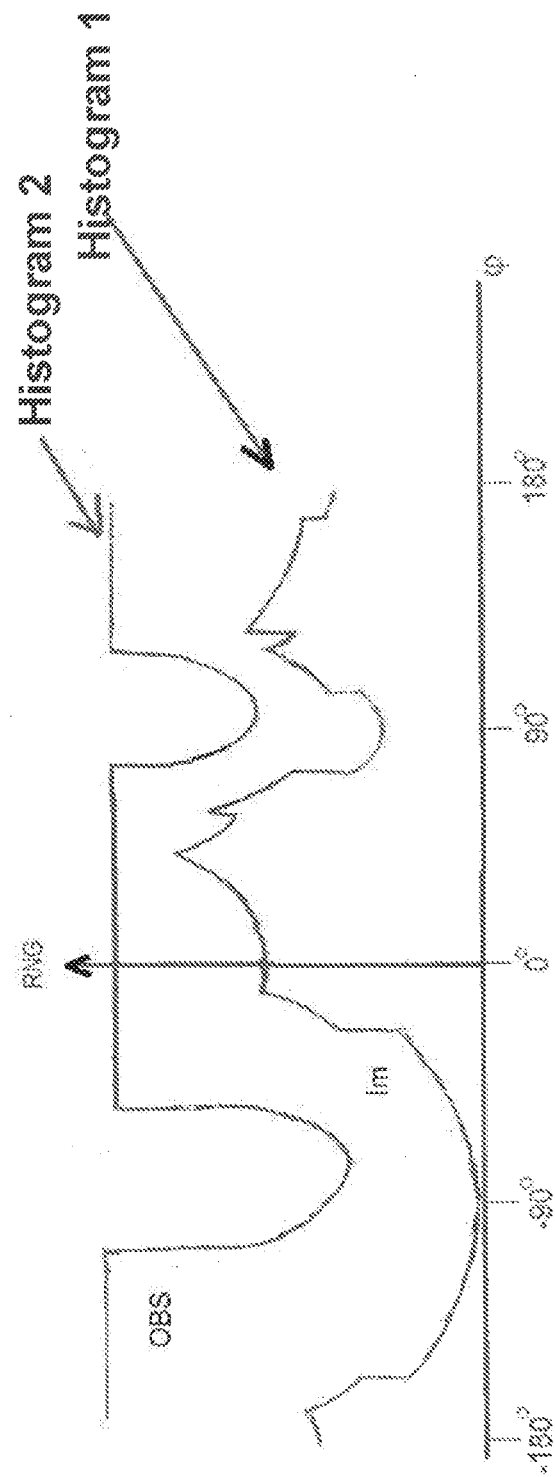

Attention is now reverted to FIG. 8a that shows a schematic illustration of an example of a vehicle 10A next to two obstacles 12a and 12b and FIG. 8b shows the respective histogram. As opposed to the examples in FIGS. 6 and 7, this example refers to a rotation point RT that is not at the center of driving symmetry axis.

According to some examples disclosed herein, a graphic user interface (GUI) displaying the histograms as shown in FIGS. 6-8 is also contemplated. The GUI can include additional information such as the vehicle outline and detected obstacles, as further shown in FIGS. 6-8. In some examples, the GUI can be generated by system 102 and transmitted over a communication link to a remote computer device (e.g., of a control unit (e.g. ground control unit) used for monitoring the operation of autonomous vehicle 100). The GUI can display to an operator in real-time the possible point-turns of the vehicle. In some examples, a point turn is executed only after a confirmation is received from an operator observing the GUI.

Reverting to FIG. 5, at block 511, based on the required conditions, a point-turn command is generated (e.g. point-turn command generation module 136). The point-turn command can include for example, instructions to the vehicle control sub-system 108, indicating how to operate the different sub-systems in order to complete the turn. The point-turn command can include instructions to the driving control sub-system indicating how to operate each driving element on each side of the vehicle. Specifically, the command can include instructions indicative of the angular range of the point turn, e.g. instructions indicating the azimuth the vehicle should assume at the end of the turn and the direction of turn i.e. whether to take a left turn or a right turn.

In case vehicle-contour range values include K sets of values, each corresponding to a different rotation point, the point-turn command can include instructions indicative of the specific velocity of each driving element on each side of the vehicle that is required in order to turn about a selected rotation point. Differential velocity on each side of the vehicle enables to control the vehicle and make the turn about the selected rotation point. In some examples, the relative velocities needed for making a turn around each of the K rotation points can be stored in the onboard (or remote) computer storage and used when the point-turn is executed. Alternatively, it can be calculated in real-time e.g., based on the distance of the rotation point from the left driving axis and the right driving axis.

At block 511 the generated point-turn command is executed by the vehicle control sub-system and the vehicle makes the point-turn. According to the disclosed technique, the point-turn command is generated and executed in real-time without a need to stop the vehicle. This enables the vehicle, and specifically a vehicle with asymmetric contour, to quickly and safely maneuver in an area dense with obstacles.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a computer-readable non-transitory memory tangibly embodying a program of instructions executable by the computer for performing the method of the presently disclosed subject matter. The term "non-transitory" is used herein to exclude transitory, propagating signals, but to otherwise include any volatile or non-volatile computer memory technology suitable to the application.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A computer implemented method of autonomously maneuvering a vehicle during a point-turn, the method comprising:

operating a scanning device from onboard the vehicle for scanning an area around the vehicle in a plurality of directions and generating real-time scanning output data;

operating at least one processing circuitry operatively connected to the scanning device, for:

generating, based on the real-time scanning output data, a range map including K set(s) of real-time range values, wherein K≥1; each set comprising a plurality of real-time range values, each range value in the set is determined from a given rotation-point of the vehicle towards a certain direction; each set of real-time range values having a corresponding set comprising a plurality of vehicle-contour range values; each vehicle-contour range value in the corresponding set is determined from the given rotation-point to a perimeter of the vehicle in a respective direction;

for each set of the K sets:

determining differences between real-time range values in the set and corresponding vehicle-contour range values in a corresponding set;

determining, based on the differences, conditions for executing a point-turn that avoids collision with nearby objects; and generating a point-turn command for causing the vehicle to execute a point-turn according to the point-turn conditions.

2. The method of claim 1, further comprising executing the point turn command and causing the vehicle to turn accordingly.

3. The method of claim 1, wherein K=1 and the rotation point are located at the center of a driving symmetry axis of the vehicle.

4. The method of claim 1, wherein K>1, and determining conditions for executing a point-turn further comprises:

determining a selected rotation point from a plurality (K) of possible rotation points along a driving symmetry axis of the vehicle.

5. The method of claim 4, wherein the point-turn command includes data indicating a first velocity of a first driving element on a first side of the vehicle, and a second velocity of a second driving element on a second side of the vehicle during the point-turn; the method further comprising:

determining the first velocity and the second velocity according to the selected rotation point and its distance from the first driving element and the second driving element.

6. The method of claim 1, wherein the conditions include a point-turn direction and range.

7. The method of claim 1, wherein each set of real-time range values, and its corresponding set of vehicle-contour range values, include range values corresponding to the same angles.

8. The method of claim 1, wherein each of the K sets of real-time range values and their corresponding sets of vehicle-contour range values are plotted in a first histogram and a second histogram, respectively; and wherein determining differences between real-time range values in the set and corresponding vehicle-contour range values in a corresponding set, is executed by shifting between relative positions of the first histogram and second histogram and comparing values in the first histogram and second histogram, in different relative positions.

9. The method of claim 1, further comprising:

while the vehicle is travelling, updating the vehicle-contour range values.

10. The method of claim 1, further comprising: implementing filtering on the real-time range values, and ignoring real-time range values which are greater than a certain threshold value.

11. A system mountable on an unmanned vehicle, comprising:
    at least one processing circuitry operatively connected to a scanning device;
    the scanning device is configured to scan an area around the vehicle in a plurality of directions and generate real-time scanning output data;
    the at least one processing circuitry is configured to:
    generate, based on the real-time scanning output data, a range map including K sets of real-time range values, wherein K≥1; each set comprising a plurality of real-time range values, each range value in the set is determined from a given rotation-point of the vehicle towards a certain direction; each set of real-time range values having a corresponding set comprising a plurality of vehicle-contour range values; each vehicle-contour range value in the corresponding set is a distance measured from the given rotation-point to a perimeter of the vehicle in a respective direction;
    for each set of the K sets:
        determine differences between real-time range values in the set and corresponding vehicle-contour range values in a corresponding set;
        determine, based on the differences, conditions for executing a point-turn that avoids collision with nearby objects;
    generate a point-turn command for causing the vehicle to execute a point-turn according to the point-turn conditions; and
    transmit the point-turn command to a vehicle control sub-system where the command is executed.

12. The system of claim 11, wherein K=1 and the rotation point is located at the center of a driving symmetry axis of the vehicle.

13. The system of claim 11, wherein K>1, wherein the at least one processer is configured for determining conditions for executing a point-turn to:
    determine a selected rotation point from a plurality (K) of possible rotation points along a driving symmetry axis of the vehicle.

14. The system of claim 11, wherein the point-turn command includes data indicating a first velocity of a first driving element on a first side of the vehicle and a second velocity of a second driving element on a second side of the vehicle during the point-turn; the at least one processing circuitry is further configured to:
    determine the first velocity and the second velocity according to the selected rotation point.

15. The system of claim 11, wherein the conditions include a point-turn direction and range.

16. The system of claim 11, wherein each set of real-time range values and its corresponding set of vehicle-contour range values include range values corresponding to overlapping directions.

17. The system of claim 11, wherein each of the K sets of real-time range values and their corresponding sets of vehicle-contour range values are plotted in a first histogram and a second histogram, respectively; and wherein determining differences between real-time range values in the set and corresponding vehicle-contour range values in a corresponding set is executed by shifting between relative positions of the first histogram and second histogram and comparing values in the first histogram and the second histogram in different relative positions.

18. The system of claim 11, wherein the at least one processing circuitry is further configured to update the vehicle-contour range values while the vehicle is travelling.

19. An unmanned vehicle, comprising:
    a scanning device for scanning an area around the vehicle in a plurality of directions and generating real-time scanning output data;
    a vehicle control sub-system configured to receive vehicle control instructions and control the vehicle in accordance with the instructions; and
    at least one processing circuitry configured to:
    generate, based on the real-time scanning output data, a range map including K sets of real-time range values, wherein K≥1; each set comprising a plurality of real-time range values, each range value in the set is determined from a given rotation-point of the vehicle towards a certain direction; each set of real-time range values having a corresponding set comprising a plurality of vehicle-contour range values; each vehicle-contour range value in the corresponding set is a distance measured from the given rotation-point to a perimeter of the vehicle in a respective direction;
    for each set of the K sets:
        determine differences between real-time range values in the set and corresponding vehicle-contour range values in a corresponding set;
        determine, based on the differences, conditions for executing a point-turn that avoids collision with nearby objects;
    generate a point-turn command for causing the vehicle to execute a point-turn according to the point-turn conditions; and
    the vehicle control sub-system is configured to execute the point-turn command and control the vehicle to turn accordingly.

20. A non-transitory computer readable storage medium retaining program instructions, the program instructions when read by a processor, cause the processor to perform a method of autonomously maneuvering a vehicle during a point-turn, comprising:
    receiving real-time scanning output data; the real-time scanning output data is generated by a scanning device from onboard the vehicle for scanning an area around the vehicle in a plurality of directions;
    generating, based on the real-time scanning output data, a range map including K sets of real-time range values, wherein K≥1; each set comprising a plurality of real-time range values, each range value in the set is determined from a given rotation-point of the vehicle towards a certain direction; each set of real-time range values having a corresponding set comprising a plurality of vehicle-contour range values; each vehicle-contour range value in the corresponding set is a distance measured from the given rotation-point to a perimeter of the vehicle in a respective direction;
    for each set of the K sets:
        determining differences between real-time range values in the set and corresponding vehicle-contour range values in a corresponding set;
        determining, based on the differences, conditions for executing a point-turn that avoids collision with nearby objects; and
    generating a point-turn command for causing the vehicle to execute a point-turn according to the point-turn conditions.

21. A computer-implemented method of monitoring a point turn of a vehicle using a graphical user interface, the method comprising:
- plotting a set of real-time range values and their corresponding set of vehicle-contour range values in a first histogram and a second histogram, respectively;
- wherein each range value in the set of real-time range values is determined from a given rotation-point of the vehicle towards a certain direction and wherein each corresponding vehicle-contour range value in the corresponding set of vehicle-contour range values is determined from the given rotation-point to a perimeter of the vehicle in the certain direction;
- displaying the first histogram and second histogram within a graphical user interface on a computer screen;
- displaying shifting between relative positions of the first histogram and second histogram and comparing values in the two histograms, in different relative positions to thereby determine differences between real-time range values in the set and corresponding vehicle-contour range values in a corresponding set; and
- determining, based on the differences, conditions for executing a point-turn that avoids collision with nearby objects;
- thereby enabling an operator to monitor and/or control the generation of a point-turn command for causing the vehicle to execute a point-turn according to the point-turn conditions.

22. The method of claim 21 further comprising displaying additional information including the outline of the vehicle and a detected obstacle.

23. A computer program product retained on a non-transitory computer medium, the computer program product executable by a processor to perform a method of monitoring a point turn of a vehicle using a graphical user interface, the method comprising:
- plotting a set of real-time range values and their corresponding set of vehicle-contour range values in a first histogram and a second histogram, respectively;
- wherein each range value in the set of real-time range values is determined from a given rotation-point of the vehicle towards a certain direction and wherein each corresponding vehicle-contour range value in the corresponding set of vehicle-contour range values is determined from the given rotation-point to a perimeter of the vehicle in the certain direction;
- displaying the first histogram and second histogram within a graphical user interface on a computer screen;
- displaying shifting between relative positions of the first histogram and second histogram and comparing values in the two histograms, in different relative positions to thereby determine differences between real-time range values in the set and corresponding vehicle-contour range values in a corresponding set; and
- determining, based on the differences, conditions for executing a point-turn that avoids collision with nearby objects;
- thereby enabling an operator to monitor and/or control generation of a point-turn command for causing the vehicle to execute a point-turn according to the point-turn conditions.

* * * * *